United States Patent [19]
Yamaguchi et al.

[11] Patent Number: 5,725,093
[45] Date of Patent: Mar. 10, 1998

[54] DISK CASE

[75] Inventors: Toshitsugu Yamaguchi; Ryouju Takagishi; Akihito Nakabayashi; Yoshiyuki Shimoi, all of Tokyo, Japan

[73] Assignee: Toshiba-EMI Limited, Tokyo, Japan

[21] Appl. No.: 811,597

[22] Filed: Feb. 26, 1997

Related U.S. Application Data

[63] Continuation of Ser. No. 503,901, Jul. 18, 1995, abandoned.

[30] Foreign Application Priority Data

Jul. 18, 1994 [JP] Japan ................................. 6-165136

[51] Int. Cl.$^6$ ........................................... B65D 85/57
[52] U.S. Cl. ...................... 206/308.1; 206/309; 229/84
[58] Field of Search ....................... 206/308.1, 308.3, 206/309, 312, 472, 450; 383/98, 99, 84; 229/307, 313, 314, 315, 76, 80, 81, 82, 84

[56] References Cited

U.S. PATENT DOCUMENTS

| | | | |
|---|---|---|---|
| 877,330 | 1/1908 | Harvey | 229/313 X |
| 2,499,436 | 3/1950 | Whitfield | 229/76 X |
| 3,220,637 | 11/1965 | Yam Yee | 229/76 |
| 4,971,195 | 11/1990 | Mitsuyama | 206/308.1 X |
| 5,101,973 | 4/1992 | Martinez | 206/308.1 |
| 5,248,032 | 9/1993 | Sheu et al. | |

FOREIGN PATENT DOCUMENTS

| | | |
|---|---|---|
| 1 282 420 | 6/1962 | France. |
| 57-37831 | 8/1980 | Japan. |
| 393 384 | 6/1933 | United Kingdom. |
| 2 147 262 | 5/1985 | United Kingdom. |

*Primary Examiner*—Jacob K. Ackun
*Attorney, Agent, or Firm*—Lowe, Price, LeBlanc & Becker

[57] ABSTRACT

A disk case has a pocket-shaped case body for accommodating a disk. Tongue pieces are provided at one edge of the case body, at the centers of opposite halves of the periphery of a disk insertion inlet thereat. These tongue pieces are formed so that one end of each is aligned with a corresponding end of the other at a first position of the end of the disk insertion inlet, and overlap or cross each other on the outside of the periphery. The respective other ends of the tongue pieces coincide with a pair of opposite edges of the case body. Perforations are provided along the boundary between each of the tongue pieces and the case body. The tongue pieces can be torn at these perforations to be separated from the case body. The disk case thus formed has a simple structure, can be easily sealed and appended to a book, and prevents a disk from moving in the case after being placed therein.

8 Claims, 3 Drawing Sheets

DISK CASE

This application is a continuation of application Ser. No. 08/503,901 filed Jul. 18, 1995 and now abandoned.

BACKGROUND OF THE INVENTION

1. Field of the Invention

The present invention relates to a disk case, and more particularly to a disk case for accommodating a disk appended to a book or the like.

2. Background of the Related Art

Conventionally, a disk appended as an appendix to a book has been accommodated in a disk case having a sack-shaped case body. Such a disk case is typically provided with a first tongue piece for sealing at a disk insertion inlet and another tongue piece to be appended to the book at a side adjacent to the disk insertion inlet.

After the disk is accommodated in the disk case, the first tongue piece for sealing is starched and bent to seal the case. After this sealing, the second tongue piece is pasted onto the book. Thus, the disk is appended to the book.

The above disk case, however, has the following defects. There is difficulty in working with the case because of its complicated structure. The disk insertion inlet, after starching and sealing, must be appended to the book, which is accompanied by poor workability. When the disk insertion inlet is sealed by starching, paste may be inadvertently applied to the disk. Further, after sealing, the disk may move in the case so that it is damaged.

SUMMARY OF THE INVENTION

A principal object of the present invention is to provide a disk case which has a simple structure, permits the case to be easily sealed and appended to a book, and prevents a disk from moving in the case after sealing.

In accordance with one aspect of the present invention, there is provided a disk case including a body having two sides connected to each other along corresponding first portions of their respective peripheries. The two sides are unconnected at respective adjacent second portions of their peripheries to define an opening which is sized for receiving and accommodating a disk with the body. Tongue pieces are respectively provided at the two sides along the insertion opening. The tongue pieces are formed so that they each have respective distal inner ends which can be placed in an overlapping relationship with each other to cooperate with each other to retain the disk within the body.

In accordance with another aspect of the present invention, perforations for cutting the case body off the tongues are formed at the boundary of the case body and the tongue pieces, or otherwise the perforations for cutting part of the tongues are formed in or at the midpoints of the tongues.

In order that the case body can be easily cut off, incisions may be formed at both ends of the boundary between the case body and the tongue pieces or both ends of the tongues where perforations are formed.

In order that the disk can be surely accommodated, the case body and the tongue pieces are preferably made of resilient material.

In accommodating a disk in the disk case, the case body is opened and then the disk is accommodated in the case body. The tongue pieces formed in the periphery of a disk insertion inlet of the case body are bent in crossing direction so that their ends cross to overlap.

Since the entire disk case is made of resilient material, when the ends of the tongues are caused to cross, the disk is accommodated in the sack-shaped case in a state that it is pressed. The disk is difficult to move within the case.

The disk can be appended to a book in such a manner that all or part of the tongues is pasted on the book by hot melt or the like.

The disk can be taken out from the book in such a manner that with part of the tongue pieces pressed by a user's fingers, the case body is cut off at the perforations.

In this case, incisions at both ends of the perforations permit the case body to be easily separated.

The disk case according to the present invention has a simple structure, permits the case to be easily sealed and appended to a book, and prevents a disk from moving in the case after sealing.

The above and other objects and features of present invention will be more apparent taken in conjunction with the accompanying drawings.

BRIEF DESCRIPTION OF THE DRAWINGS

FIG. 4 is a view showing the manner that the disk case according to the present invention is pasted onto a book or the like;

DETAILED DESCRIPTION OF THE PREFERRED EMBODIMENTS

Figure 1:
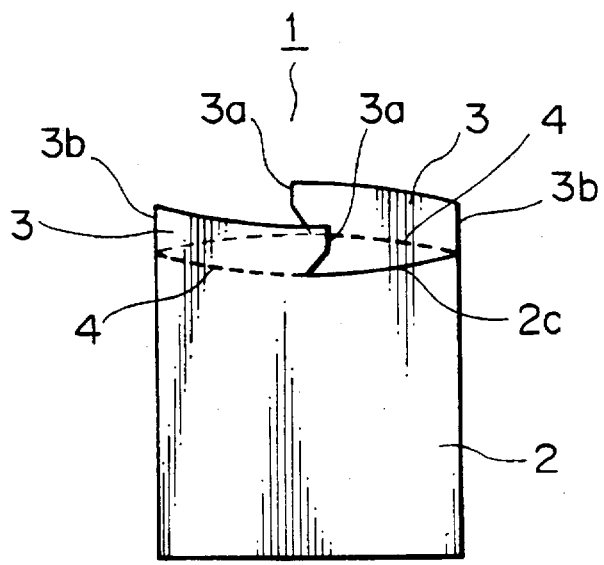
FIG. 1 is a view showing a first preferred embodiment of a disk case according to the present invention.

Now referring to the drawings, an explanation will be given of embodiments of the present invention.

Embodiment 1

FIG. 1 shows the first preferred embodiment of a disk case according to the present invention. This disk case 1 has a sack-shaped case body 2 for accommodating a disk. Tongue pieces 3, 3 are provided at about the centers of the opposite side edges 2c, 2c of a disk insertion inlet of the case body 2.

Figure 3:
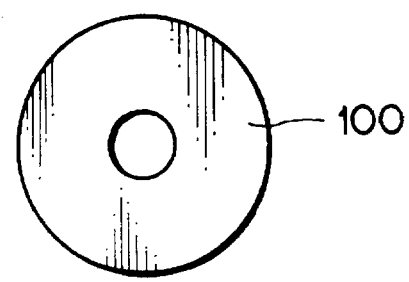
FIG. 3 is a view showing the manner in which a disk is accommodated in the disk case according to the first embodiment of the present invention.

These tongue pieces 3, 3 are formed so that their end 3a, 3a coincide with other where they meet respective side edges 2c, of the periphery of the disk insertion inlet of the case body 2. Distal end portions 3a, 3a of tongue pieces 3, 3, as best seen in FIGS. 1 and 3, cross outside edges 2c, 2c of The other ends 3b, 3b of the tongue pieces 3 and 3' coincide with each other at corresponding outer sides of the case body 2, respectively. At the boundary between each of the tongue pieces 3, 3 and the case 2, perforations 4, 4 are formed so that tongue pieces 3, 3 can be separated thereat from the case 2.

Figure 2:
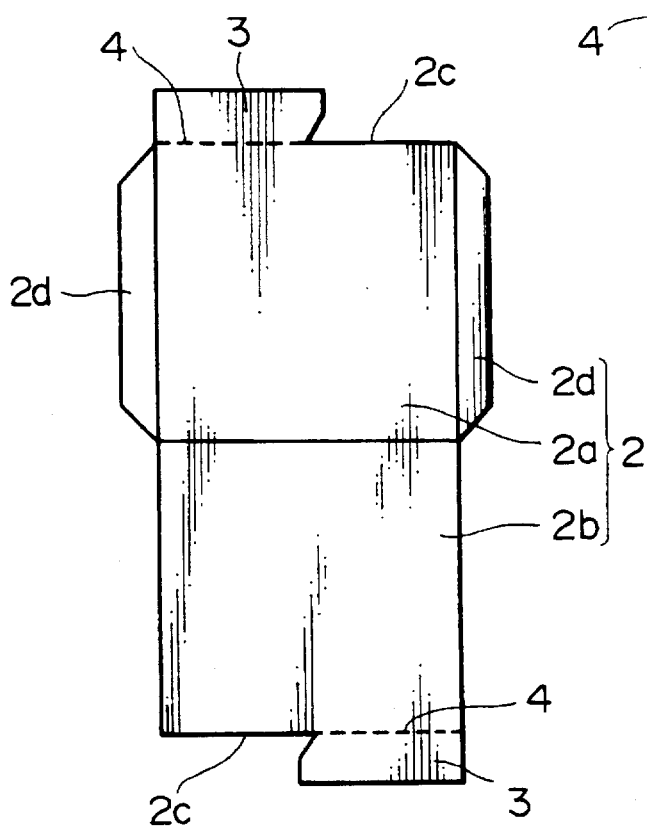
FIG. 2 is a development view of the disk case according to the first embodiment.

FIG. 2 is a development view of the disk case 1. The case body 2 includes a front sheet 2a, a back sheet 2b and overlap widths 2d, 2d on opposite sides of the front sheet 2a. The front face and back face of the assembled casing body are similar and are interchangeable.

The disk case 1 can be assembled as follows. First, the overlap widths 2d, 2d are bent and paste is applied on their faces. Next, the back sheet 2b is bent at a boundary line between it and the front sheet 2a and the paste-covered overlap widths 2d, 2d are folded over to adhere to back sheet 2b, thus completing the disk case 1.

The disk case 1 is preferably made of resilient paper material. It is so designed so that even when the disk insert inlet is opened by a pressing force applied to both ends, it returns to its closed disposition when such pressing is ceased.

As shown in FIG. 3, therefore, the case body 2 can be pressed by the user's fingers from opposite sides of the insertion inlet of case body 2 to open the disk insertion inlet and a disk 100 is then accommodated in the case body 2. Force is also applied to the tongues 3, 3 in the directions of the arrows best seen in FIG. 3 so that the distal ends of the tongues are caused to cross. Thus, the disk 100 is accommodated in the sack-shaped case body 2 to be in a state such that it is pressed on from by both sheets 2a and 2b. The disk is thus contained so that it is difficult to move it within the case 1.

Figure 4:
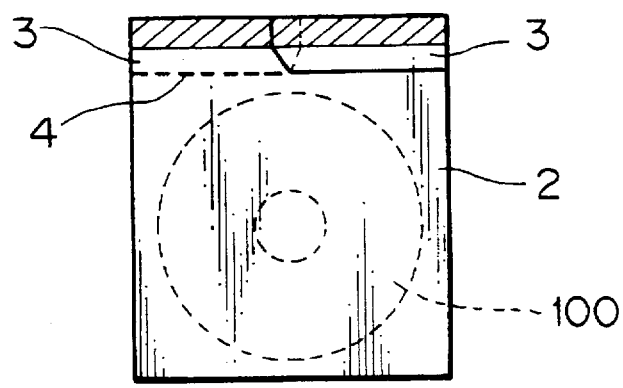

The disk 100 accommodated in the disk case 1 can be appended to a book or the like. As shown in FIG. 4, a bonding agent such as a hot melt is applied to shaded portions of the tongue pieces 3, 3, and the case 1 is pasted on and bonded to a predetermined portion of the book.

The disk 100 thus appended to the book can be taken out in such a manner that, with the tongue pieces 3, 3 pressed by fingers, a part of the case 2 is separated from the perforation 4.

In this way, the disk case 1 according to this embodiment can be easily worked, sealed and appended to the book. The tongue pieces 3, 3 have only to cross, as best seen in FIG. 4, to prevent the disk from dropping out of casing body 2. Further, since the disk 100 will not move within the case 1, it will not damaged. Thus, its quality can be assured.

Embodiment 2

An explanation will now be given of the second embodiment of a disk case 11 according to the present invention. Like reference parts in the first and second embodiments are identified by the same numerals.

Figure 5:
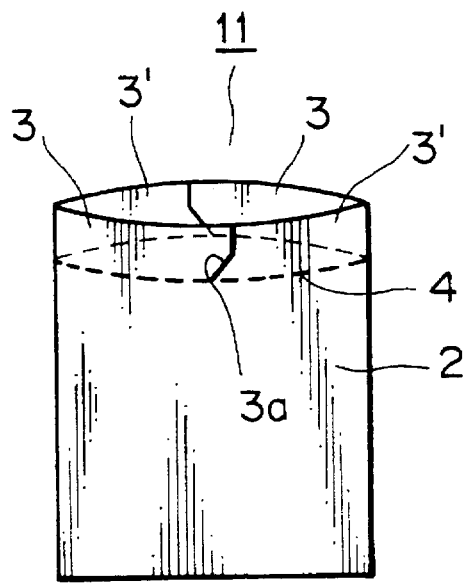
FIG. 5 is a view showing a second embodiment of a disk case according to the present invention.

FIG. 5 shows a second preferred embodiment of a disk case 11 according to the present invention. The disk case 11 according to the second embodiment is different from that according to the first embodiment in that tongue pieces 3' and 3' are also provided at sides which are opposite to both halves of the periphery of the disk insertion inlet of case body 2 where the tongue pieces 3 and 3 are formed.

Figure 6:
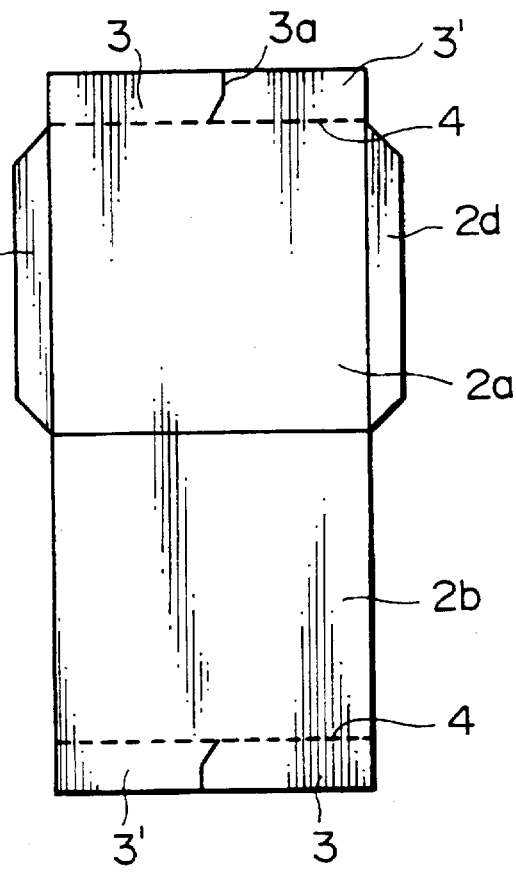
FIG. 6 is a development view of the disk case according to the second embodiment.
Figure 7:
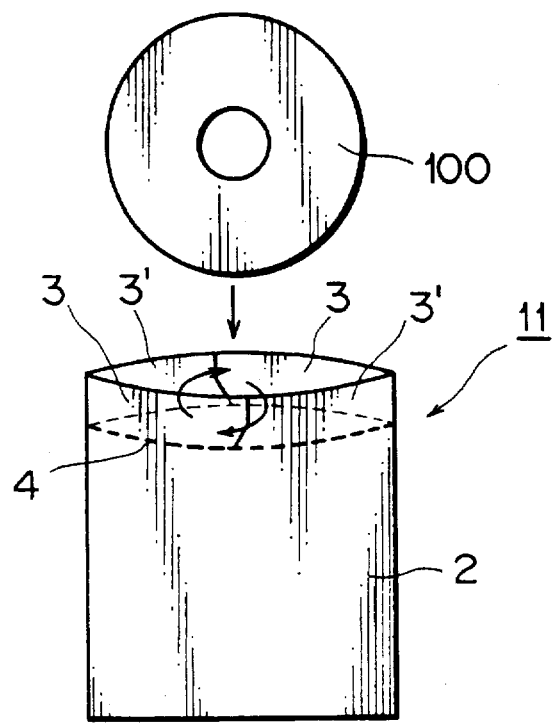
FIG. 7 is a view showing the manner in which a disk is accommodated in the disk case according to the second embodiment of the present invention.

FIG. 6 is a development view of the disk case 11 which can be assembled in the same general manner as in the first embodiment. Disk 100 can be accommodated in the case 11 in the same manner as in the first embodiment, as best seen in FIG. 7.

As described above, the disk case 11 according to the second embodiment is different from the disk case 1 in that the tongue pieces 3', 3' are formed oppositely to the tongue pieces 3, 3. The disk case 1 according to the first embodiment, therefore, can be considered to be in the state where the tongues 3', 3' have been cut off the disk case 1 according to the first embodiment. This means that one step can be reduced from the process of making the disk case 11 according to the first embodiment.

Embodiment 3

An explanation will now be given of a third embodiment of a disk case 21 according to the present invention. Parts in the third embodiment which like parts in the first embodiment bear the same identifying numerals for ease of reference.

Figure 8:
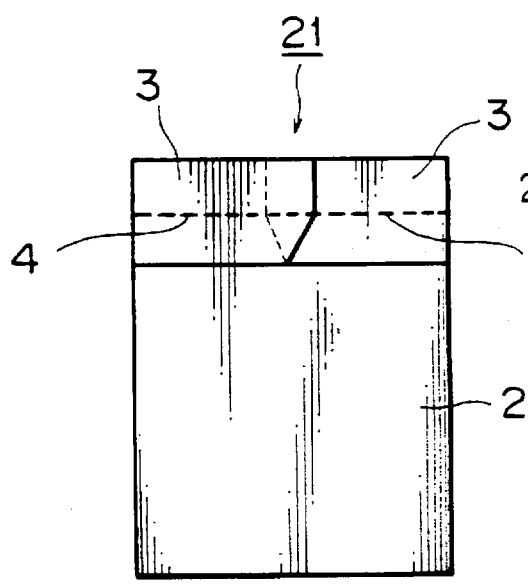
FIG. 8 is a view showing the third embodiment of a disk case according to the present invention.

FIG. 8 shows the third embodiment of the present invention. The disk case according to the second embodiment is different from that according to the first embodiment in that perforations 4, 4 are formed in or at midpoints of the tongue pieces 3 and 3 formed on opposite sides of the periphery 2c of the disk insertion inlet of the case body 2 of disk case 21.

In such a structure, the outermost parts of the tongue pieces 3 and 3 are pasted to each other as shown in FIG. 4. Therefore when disk 100 is taken out, the disk case has an opening at the perforations 4 and 4. The case 2 can be closed by crossing of the distal triangular ends of the tongue pieces 3, 3. See FIG. 8.

Figure 9:
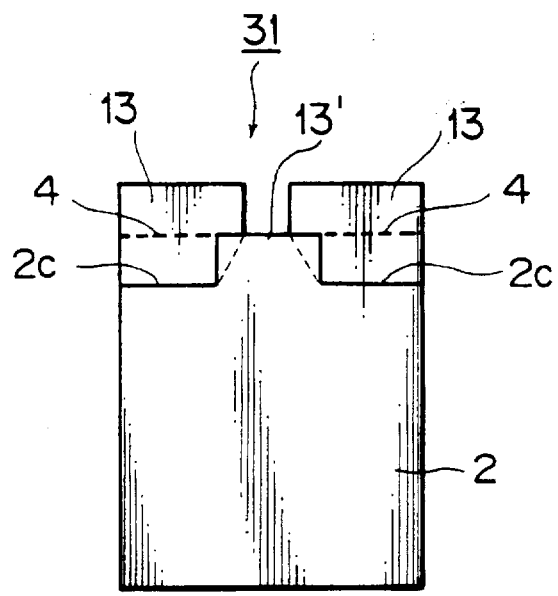
FIG. 9 is a view showing a modification of the third embodiment.

A disk case 31 according to a modification of the third embodiment is shown in FIG. 9. Specifically, at the center of the periphery 2c of the disk insertion inlet for the front sheet 2a, a square 13' is on both sides of the periphery 2cof the disk insertion inlet for the back sheet 2b, tongue pieces 13 and 13 coincide with the tongue piece 13' at the periphery of the disk insertion inlet, and cross it on the outside of the periphery.

In this case also, the perforations 4, 4 may be formed at the midpoints of the tongue pieces 13, 13. The tongue piece 13 preferably has a height at the perforations 4, 4 of the tongue pieces 13, 13. In this way, the disk case 31 can be easily cut off from the book at perforations 4, 4.

Figure 10:
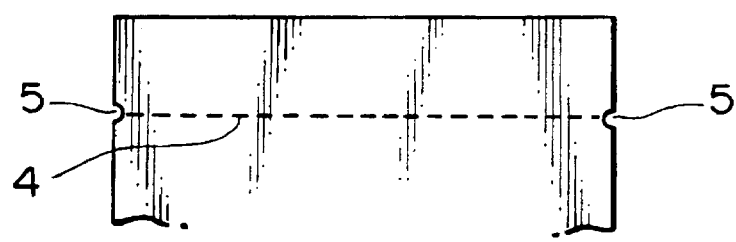
FIG. 10 is a view showing a perforation with incisions formed at both ends.

Further, as shown in FIG. 10, incisions 5 may be formed at the ends of the tongue piece 13 where both ends of the perforation 4, or both ends of the boundary between the case body 2 and the tongue pieces 3, 3, are located. The incisions 5 permit the disk case to be further easily cut off from the book.

Although the present invention has been described and illustrated in detail, it should be clearly understood that the same is by way of illustration and example only and is not to be taken by way of limitation, the spirit and scope of the present invention being limited only by the terms of the appended claims.

What we claim:

1. A disk case, comprising:
   a body having two sides connected to each other along corresponding first portions of their respective peripheries, the two sides being unconnected at respective adjacent second portions of their peripheries to define an opening which is sized for receiving and accommodating a disk with the body; and
   tongue pieces respectively provided at said two sides along said opening,
   wherein said tongue pieces are formed so that they each have respective distal inner ends which can be placed in an overlapping relationship with each other to cooperate with each other to retain the disk within the body,
   wherein a plurality of perforations is provided between said case body and each of said tongues, said perforations enabling a separation of said case body from said tongues.

2. A disk case, comprising:

a body having two sides connected to each other along corresponding first portions of their respective peripheries, the two sides being unconnected at respective adjacent second portions of their peripheries to define an opening which is sized for receiving and accommodating a disk with the body; and tongue pieces respectively provided at said two sides along said opening, wherein said tongue pieces are formed so that they each have respective distal inner ends which can be placed in an overlapping relationship with each other to cooperate with each other to retain the disk within the body, wherein a plurality of perforations is provided in each of said tongues, said perforations enabling separation of a part of each of said tongues.

3. A disk case according to claim 1, wherein:

incisions are provided at opposite ends of a boundary between said case body and each of said tongues.

4. A disk case according to claim 1, wherein:

said case body and said tongues are made of a resilient material.

5. A disk case according to claim 2, wherein:

incisions are provided at opposite ends of a boundary between said case body and each of said tongues.

6. A disk case according to claim 2, wherein:

said case body and said tongues are made of a resilient material.

7. A disk case according to claim 5, wherein:

said case body and said tongues are made of a resilient material.

8. A disk case according to claim 3, wherein:

said case body and said tongues are made of a resilient material.

* * * * *